Dec. 14, 1971  E. L. WEIMER  3,626,628
FISHING LURE OF PLUG TYPE
Filed Jan. 16, 1970  2 Sheets-Sheet 1

INVENTOR.
Emory L. Weimer
BY
Fred C. Matheny
ATTORNEY

INVENTOR.
Emory L. Weimer
BY
Fred C. Matthews
ATTORNEY

United States Patent Office 3,626,628
Patented Dec. 14, 1971

3,626,628
FISHING LURE OF PLUG TYPE
Emory L. Weimer, P.O. Box 57, Orondo, Wash. 98843
Filed Jan. 16, 1970, Ser. No. 3,373
Int. Cl. A01k *85/00*
U.S. Cl. 43—42.03                                11 Claims

ABSTRACT OF THE DISCLOSURE

This plug has, near its forward end, at least one external rudder type vane swingingly supported by a pivot post whose axis is in the plane of the vane and is perpendicular to and intersects the longitudinal axis of the plug. The vane can swing to both sides of a medial plane common to the axis of the pivot post and the axis of the plug and detent means lightly but releasably holds the vane in either of its maximum inclined positions. The plug has two water passageways which receive water near the head and discharge it sidewise in opposite directions near the rear end of the plug. The vane operates valve means which controls the flow of water in the passageways so that the plug guiding action of the vane and of the discharging water augment each other in causing the plug to follow an irregular zig-zag course.

SUMMARY OF THE INVENTION

My invention relates to fishing lures of the plug type and a general object of my invention is to improve and increase the efficiency of fishing plugs of the type disclosed in my two prior Patents No. 3,196,574 and No. 3,279,117.

Another object is to provide a plug having rudder type vane means and water jet means which operate jointly and in cooperation with each other to impart an alluring, side to side darting, or zig-zag movement to a plug in the water.

Another object is to provide a fishing plug in which the reaction of water external to the plug against at least one pivotally supported vane and the jet force reaction of water which flows through longitudinal passageways in the plug and discharges transversely from locations near the rear end of the plug combine to impart to the plug an irregular zig-zag movement in the water which is alluring to fish and in which the amplitude of this zig-zag movement is further increased by yielding detent means which exerts a relatively light detent or holding force on the vane when said vane is at or near the limit of its swinging movement in either direction.

Another object is to provide a plug in which either magnetic or spring means or the pressure of water against a ball valve can be used to exert a light holding force on at least one vane when said vane is at or near the limit of its movement in two directions.

Other objects will be apparent from the following description and accompanying drawings.

BRIEF DESCRIPTION OF THE DRAWINGS

Like reference numerals refer to like parts throughout the several views.

DESCRIPTION OF THE PREFERRED EMBODIMENTS

Figure 1:
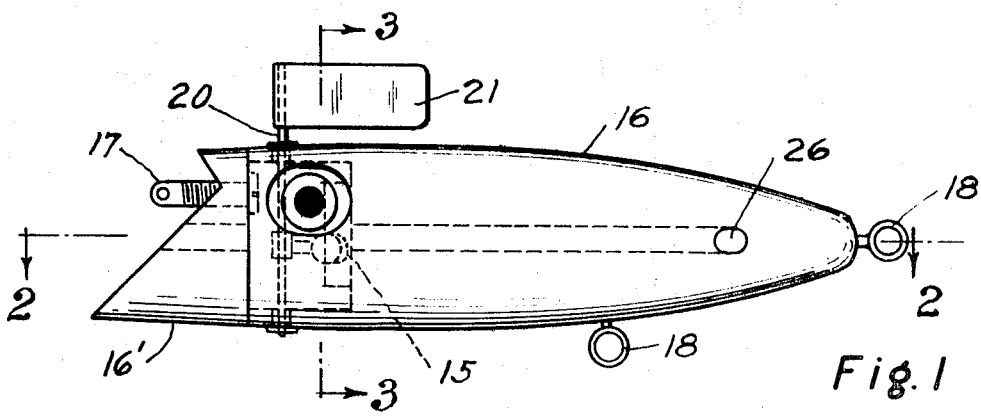
FIG. 1 is a side elevation of a fishing lure embodying my invention.
Figure 2:
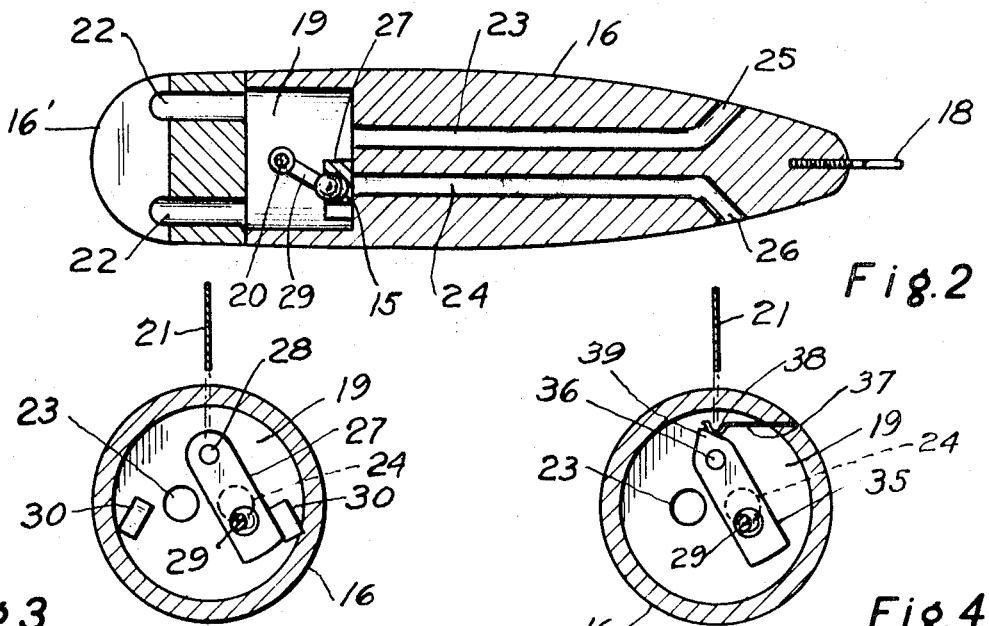
FIG. 2 is a longitudinal sectional view of the same taken on line 2—2 of FIG. 1, parts being shown in plan.
Figures 3, 4, 5, 6, 6A:
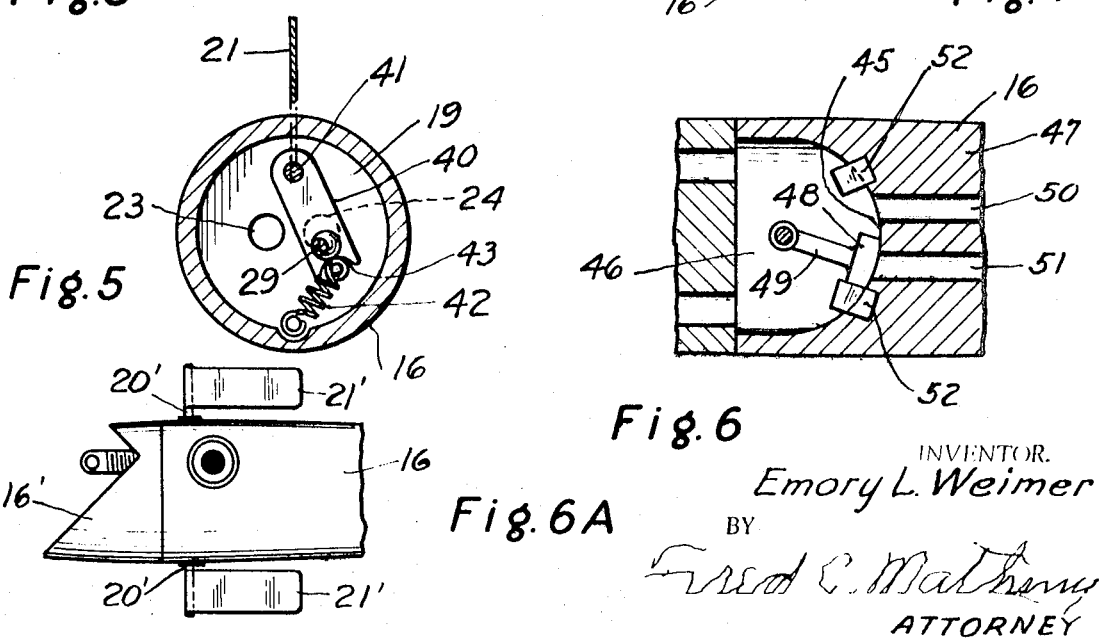
FIG. 3 is a view in cross section, with parts in elevation taken on line 3—3 of FIG. 1.
FIG. 4 is a view in cross section, with parts in elevation, showing a modified form of the invention in which spring instead of magnetic detent means is used.
FIG. 5 is a view similar to FIG. 4 showing another form of spring detent means.
FIG. 6 is a fragmentary view in longitudinal section, with parts in plan, showing valve means of modified form in which a valve is attached directly to the end of a valve operating arm.
FIG. 6A is a fragmentary view in elevation showing a plug having two rudder type vanes attached to the same shaft or post on opposite sides of the plug body.

The embodiment of the invention shown in FIGS. 1, 2 and 3 comprises a plug body 16 which can be varied in shape and can be formed of different materials and any desired number of parts. Any suitable devices 17 and 18 are provided, respectively, for attaching a line to the forward end and leader and hook means to the rear end and lower side of the plug body.

The forward end portion of the plug body 16 has in it a cavity 19 and a post or pivot pin 20 extends crosswise through the forward end part of the plug body and through the cavity 19. By way of illustration FIGS. 1 and 3 show an externally positioned rudder type water reaction vane 21 attached to the portion of the post 20 which protrudes above the plug body 16. However it is obvious that vane 21 may be below the plug body or that the post 20 may be longer and protrude in both directions and two vanes be used as shown in FIG. 6A and later explained. In this connection it is noted that the plug body 16 is balanced so it normally tends to assume the position in the water in which it is shown in FIGS. 1 and 3.

The axis of the post 20 intersects the longitudinal axis of the plug body 16 and the vane 21 can swingingly move through a limited arc from one side to the other of a plane common to the axis of the post 20 and the axis of the plug body 16. Obviously when the vane 21 is inclined in either direction relative to a plane common to the axes of the post 20 and the plug body 16 and water reacts against it the water reaction will tend to move the forward end of the plug to one side and the plug will tend to move sidewise in the direction in which it is urged by the sidewise pressure of the water. Perforations 22 are provided in the front end 16′ of the plug body 16 to allow the water to enter freely into the cavity 19.

The plug body 16 is provided with two water passageways 23 and 24 which extend lengthwise in said plug body from the rear wall of the cavity 19 to a location near the rear end of the plug body where they terminate, respectively, in two oppositely directed outlet ports 25 and 26. The passageways 23 and 24 are positioned at opposite sides of a plane common to the axis of the post 20 and the axis of the plug body 16 and this plane will normally be approximately vertical when the plug is in use in the water. If hooks are attached to the lower side of the plug they will help in maintaining it with the vane 21 uppermost in the water. Thus it will be seen that the ports 25 and 26 are positioned to direct water outwardly in opposite directions from the sides of the plug body and that this discharging water can exert a jet force tending to guide said plug body.

The forward ends of the passageways 23 and 24 intersect the rear wall of the cavity 19 at spaced apart locations and a valve member 27, positioned against said rear wall is supported for swinging movement by a pivot member 28 and adapted to be moved to close the opening to either of the passageways 23 or 24. An arm 29, rigid with the post 20, engages with the valve member 27 and is adapted to move said valve member into closing relation to either passageway 23 or 24. A recess 15 in the valve 27 receives the end of the arm 29 and is large enough to provide working clearance for the end of said arm.

Stop means is provided to limit angular movement of the valve 27 and vane 21 in two directions so they can swing about an equal distance to each side of a plane common to the axis of the post 20 and plug body 16. The stop means shown in FIGS. 2 and 3 is in the form of two magnets 30, which also serve as detent means each capable of exerting at least a relatively light holding force on the valve 27, it being understood that valve 27 is formed of material capable of being magnetically attracted. Obviously the valve 27 can be a magnet and parts 30 a material to which it is attracted.

When the plug is being trolled through water or is being used in flowing water and the vane 21 moves to one side of center the attraction of the magnet 30 then closest to the valve 27 will move valve 27 and vane 21 sidewise until their movement is stopped by the magnet 30 with the valve 27 closing the passageway 23 or 24 nearest to the magnet. In this position the vane 21 is inclined toward the magnet that is holding it and reaction of the water against it tends to angularly move the plug in one direction about a generally upright axis perpendicular to the longitudinal axis of the plug. At the same time water discharging sidewise from the port 25 or 26 of the then open passageway 23 or 24 will exert a jet force tending to angularly move the plug in the same direction as the water reaction against the vane does. These two forces thus augment each other and tend to incline the plug body at a greater angle than either force alone would do. The angular movement thus imparted to the plug by the vane 21 and the discharging jet of water is a steering or guiding movement which causes the plug to veer or change course sharply in one direction. This results in an increase of water pressure against the vane which overcomes the holding force being exerted by the magnet and causes the vane and valve to move to the opposite side of center where the valve rests against and is yieldingly held by the other magnet and closes the other passageway and external water pressure is exerted against the other side of the vane.

This cycle of operation is repeated at relatively short intervals depending on the velocity of the water relative to the plug and a somewhat erratic zig-zag movement, which is alluring to fish, is imparted to the plug.

FIGS. 4 and 5 show two different modified forms of the invention in which the magnets are omitted and spring detent means is used to releasably hold a valve and the vane connected with it at the limits of their movement in both directions in the same way they are held by the magnets shown in FIGS. 2 and 3. In FIG. 4 a plug body 16, cavity 19, passageways 23 and 24, post 20, vane 21 and arm 29 are the same as the similarly numbered parts shown in FIGS. 1–3 and just described. A valve member 35, supported for swinging movement on a pivot 36, is adapted to close either of the two passageways 23 or 24 and its movement in both directions is limited by engagement with the plug body. The valve member 35 and a spring 27, which is supported form the plug body 20, are provided respectively with cam shaped parts 38 and 39, which cooperate in such a manner as to enable the spring 39 to exert a yielding detent force tending to hold the valve 35 at the limit of its movement in both directions. Since the valve 35, arm 29, post 20 and vane 21 are all connected together and all oscillate between two positions in which they are stopped by the same means it will be apparent that a spring similar to spring 37 can be applied to any of the these parts to serve as a detent means.

In FIG. 5 the parts 16, 19, 21, 23, 24 and 29 are similar to the correspondingly numbered parts in FIGS. 1 to 3 but a valve member 40 of modified shape is swingingly supported by a pivot member 41 and a compression spring 42 has one end positioned in a recess 43 in the valve 40 and the other end supported against the plug body. The spring 42 is positioned so that the line along which it exerts pressure on valve 40 will cross from one side to the other of the axis of pivot 41 as the valve moves between its two maximum angular positions and will yieldingly hold the valve at the limit of its movement in either direction. Obviously a tension spring can be used in a similar manner by positioning it so its line of pull passes from one side to the other of a pivot similar to pivot 41. The plugs shown in FIGS. 4 and 5 operate in a manner similar to the plug shown in FIGS. 1 to 3.

FIG. 6 shows a modified form of the invention which differs from those previously described in that the bottom wall 45 of a cavity 46 in a plug body 47 is concave to provide clearance for a valve member 48 carried on the outer end of an arm 49 which is pivotally supported from a post 20′ that is the same as previously described post 20. Arm 49 operates in the same manner as the arm 29 to move the valve member 48 and close either of two water passageways 50 or 51 in plug body 47. Two magnets/52 are respectively positioned to yieldingly hold the valve 48 closed relative to either passageway 50 or 51. The magnets 52 serve as stop members for valve 48 and exert a detent force on the same. When it is in use the plug shown in FIG. 6 operates in a similar manner to the plug shown in FIGS. 1–3.

In the modified form of invention shown in FIG. 6A the plug body 16 is the same as the correspondingly numbered plug body shown in FIGS. 1 to 6 but a shaft or post 20′ which corresponds to post 20 of FIGS. 1 to 6 is longer than shaft 20 and protrudes from two opposite sides of the plug body and a vane 21′ is rigidly attached to each protruding end of post 20′. The two vanes 21′ provide more vane area than one vane of the same size does and they provide a balanced structure.

Figure 7:
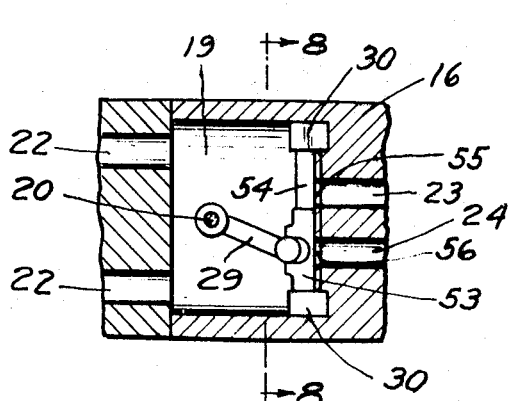
FIG. 7 is a fragmentary view in longitudinal section, with parts in plan, showing a modified form of the invention in which a sliding valve is used.
Figure 8:
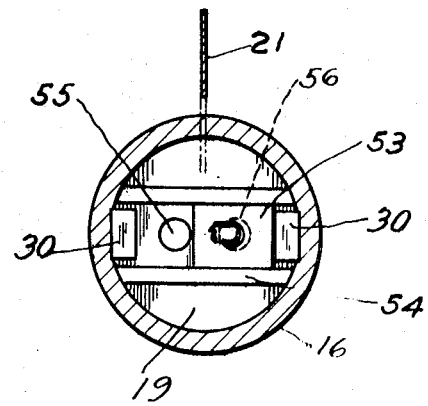
FIG. 8 is a view in cross section, with parts in elevation taken on line 8—8 of FIG. 7.

FIGS. 7 and 8 show a modified form of the invention in which parts numbered 16, 19, 20, 23, 24, 29 and 30 are the same as similarly numbered parts in FIGS. 1 to 3 but in which a slidable valve 53 is guided for longitudinal movement in a channel shaped guide member 54. The guide member 54 is secured to the bottom wall of the cavity 19 in the plug body 16 and has ports 55 and 56 which register with the passageways 23 and 24 respectively. The valve 53 is moved by the arm 29 to close either port 55 or 56 and leave the other port open. The operation of this plug in the water is simliar to that of the plug shown in FIGS. 1 to 3.

Figure 9:
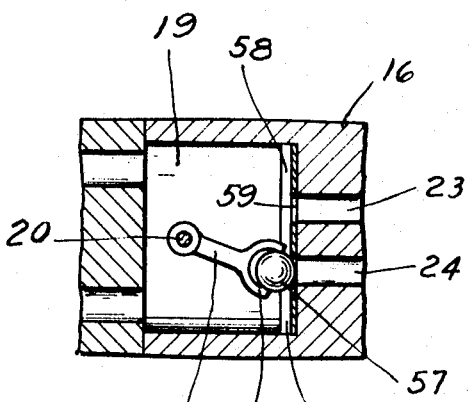
FIG. 9 is a fragmentary view in longitudinal section, with parts in plan, of a modified form of my invention using a ball valve.

FIG. 9 shows a modified form of the invention in which parts numbered 16, 19, 20, 23 and 24 are the same as similarly numbered parts in FIGS. 1 to 3 but in which all magnets and detent springs are omitted and a ball valve 57 is movably disposed in a guide member of 58 of channel shaped cross section and operates to close either of two ports 59 in said guide member, which ports 59 register with the passageways 23 and 24. The ball 57 further acts as a yieldable detent member which tends to remain in closed relation to either port 59 in which it is seated until the water reacts against a vane similar to vane 21 of FIGS. 1 to 3 with sufficient force to dislodge said ball 57. An arm 60 rigid with post 20 has a forked end portion 51 which fits over the ball 57 and completes an operative connection between ball 57 and post 20. The guide channel 58 is usually approximately horizontal when the plug is in the water. The ball 57 protrudes a short distance into the port it is closing and is urged toward said port by water pressure and it serves as a detent because at least a slight force must be exerted on it by the arm 50, 61 to dislodge it.

Figure 10:
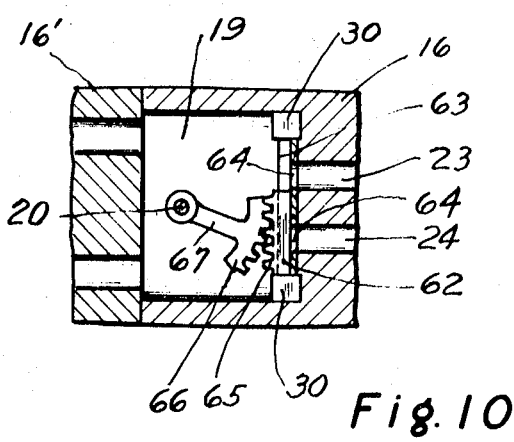
FIG. 10 is a fragmentary view in longitudinal section, with parts in plan, showing a modified form of my invention in which a slide valve is moved by a gear rack and gear segment.

FIG. 10 shows a modified form of the invention in which parts numbered 16, 19, 20, 23 and 30 are the same as similarly numbered parts in FIGS. 1 to 3 but in which a slidable valve member 62 is guided in channel shaped guide member 63 having ports 64 which register with the passageways 23 and 24. A gear rack 65 rigid with valve 62 meshes with a gear segment 66 on an arm 67. Arm 67 is secured to post 20 and operates in an obvious manner to close and open the ports to passageways 23 and 24 as post 20 is angularly moved between the two limits of its movement. Magnets 30 exert at least a slight detent force on valve 62. Obviously detent spring means can be used as detent means in FIG. 10 in place of magnets 30.

Figure 11:
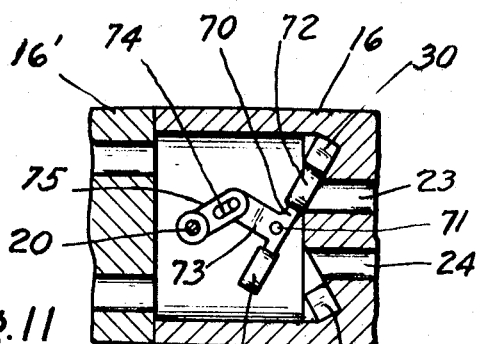
FIG. 11 is a fragmentary view in longitudinal section, with parts in elevation, showing a modified form of plug in which a rocker type valve is used.
Figure 12:
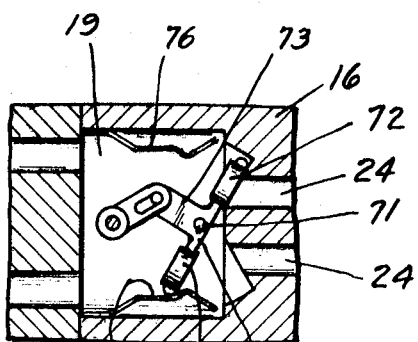
FIG. 12 is a view similar to FIG. 11 showing an application of spring detent means to the rocker type valve.

FIGS. 11 and 12 show two other modified forms of the invention in which parts numbered 16, 19, 20, 23, 24 and 30 are the same as the similarly numbered parts in FIGS. 1 to 3 but in which the valve means is different. Said valve means comprises an arm 70 supported for rocking movement on a pivot 71 and having a valve part 72 on each end. A lever 73 rigid wtih rocker arm 70 is connected by slot and pin means 74 with an arm 75 which is carried by the post 20 and operates in a manner similar to arm 29 to impart rocking movement to member 70. Obviously member 70 can be angularly moved by arm 75 to close either passageway 23 or 24 and leave the other passageway open and when either valve part 72 is in a closed position it is releasably detained by one of the magnets 30.

In the modified form shown in FIG. 12 the magnets 30 are omitted and springs 76, only one of which is shown, are provided in suitable positions to be engaged by the rocker arm when it is in either passageway closing position. Otherwise the plug shown in FIG. 12 is the same as the plug shown in FIG. 11.

Figure 13:
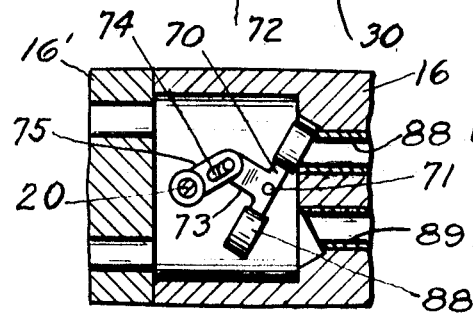
FIG. 13 is a view similar to FIG. 11 and showing a plug which is similar to the plug of FIG. 11 except that the valves on a rocker arm are magnets and said valves seat against the ends of tubes of magnetic material which attracts and yieldingly holds them closed.

In the modified form of the invention shown in FIG. 13 a plug body 16a has in its parts 20, 70, 71, 73, 74 and 75 which are the same as similarly numbered parts in FIG. 11 and herein before described. The rocker arm 70 in FIG. 13 has, on each end, a combined magnet and valve 88 adapted to close an opening in the end of a tube 89 in plug body 16a, two of the tubes 89 being provided. Tubes 89 take the place of passageways 23 and 24 in FIGS. 1 to 12 inclusive. Said tubes 89 are formed of material to which combined magnets and valves 88 are attracted so that said magnets and valves 88 are yieldingly held in their closed positions but will be opened by water pressure against a suitable vane on post 20. Obviously the combined magnet and valve 88 can be made in two parts, one a magnet and the other a valve. The device shown in FIG. 13 operates in the same manner as the one shown in FIG. 11.

I claim:

1. In a fishing plug, a plug body having near its forward end a cavity into which water can enter freely; two longitudinal water passageways in said plug body communicating with said cavity and extending rearwardly therefrom and terminating in at least two approximately transversely and oppositely directed water discharge ports; a pivot post supported by the plug body near the forward end thereof for pivotal movement about an axis which intersects and is approximately perpendicular to the longitudinal axis of the plug body; an arm rigid with the post and extending outwardly therefrom; a rudder type plug guiding vane supported by the post and adapted to pivotally move said post in response to water reaction on said vane; and valve means connected with said arm and operated by swinging movement of said arm controlling the flow of water in said passageways, said valve means providing a discharge of water from the discharge ports of said passageways in a direction exerting on said plug body a guiding force urging said plug body in the same angular direction as it is then being urged by the force of the water reacting against said vane.

2. The fishing plug as claimed in claim 1 in which means is provided limiting swinging movement of the vane in two directions; and in which detent means is provided releasably holding the vane at the limit of its movement in both directions.

3. The fishing lure as claimed in claim 2 in which the detent means is magnetic.

4. The fishing plug as claimed in claim 2 in which the detent means is spring means.

5. The fishing plug as claimed in claim 1 in which the water passageways in the plug body have spaced apart water inlet openings in the bottom wall of the cavity in the forward end portion of the plug body and in which the valve means comprises a swingingly mounted member movable between said inlet openings and capable of closing only one of said inlet openings at a time.

6. The fishing plug as claimed in claim 1 in which the water passageways in the plug body have spaced apart water inlet openings in the bottom wall of the cavity in the forward end portion of the plug body and in which the valve means comprises a slidable member in the bottom of said cavity movable by said arm to open and close the water inlet openings to said passageways and only capable of closing one of said water inlet openings at a time.

7. The fishing plug as claimed in claim 1 in which the water passageways in the plug body have spaced apart water inlet openings in the bottom wall of the cavity in the forward end portion of the plug body and in which the valve means comprises a valve member carried by the end of the arm remote from the post and movable by the arm into a closed position relative to the water inlet opening adjacent the end of the arm when the arm is at the limit of its movement in either direction.

8. The fishing plug as claimed in claim 1 in which the valve means comprises a rocker member fulcrumed between the water inlet openings to said passageways and connected with said rudder type vane for rocking movement by said vane; a valve carried by each end portion of said rocker member, said valves being positioned so they will alternately be moved into open and closed positions relative to the respective water inlet openings of said passageways by rocking movement of said rocker member; and readily releasable detent means operable to yieldingly hold each valve member in a closed position.

9. The fishing plug as claimed in claim 8 in which the readily releasable detent means is magnetic.

10. The fishing plug as claimed in claim 8 in which the readily releasable detent means is spring means.

11. The fishing plug as claimed in claim 1 in which a valve guide member of channel shaped cross section is provided in the bottom of the cavity and two spaced apart water inlet openings are provided in the bottom of said guide member and communicate with said passageways and in which the valve means comprises a ball valve in the guide member movable by said arm between two positions in either of which it closes one of said water inlet openings, said ball when it is seated in either water inlet opening and subjected to water pressure exerting on said arm and the post and vane connected therewith a yielding force retarding their movement toward the other water inlet opening.

References Cited

UNITED STATES PATENTS

| | | | |
|---|---|---|---|
| 2,565,099 | 8/1951 | Simmons | 43—42.03 |
| 2,600,437 | 6/1952 | Sieppe | 43—42.03 |

MELVIN D. REIN, Primary Examiner

U.S. Cl. X.R.

43—42.06, 42.22